United States Patent

Bridges

[11] Patent Number: 5,851,037
[45] Date of Patent: Dec. 22, 1998

[54] PIPE COUPLING WITH GASKET POSITIONER

[76] Inventor: Donald Y. Bridges, 3014 Creek Ct., Roswell, Ga. 30075

[21] Appl. No.: 843,869

[22] Filed: Apr. 17, 1997

[51] Int. Cl.⁶ .................................................. F16L 17/02
[52] U.S. Cl. .......................... 285/342; 285/348; 285/369
[58] Field of Search .................................. 285/343, 369, 285/335, 339, 337, 348, 379, 342

[56] References Cited

U.S. PATENT DOCUMENTS

| | | | |
|---|---|---|---|
| 2,822,195 | 2/1958 | Hoke | 285/337 |
| 2,842,383 | 7/1958 | Merrill | 285/413 |
| 3,288,495 | 11/1966 | Newell et al. | 285/53 |
| 3,815,940 | 6/1974 | Luckenbill | 285/342 X |
| 3,910,610 | 10/1975 | Turner et al. | 285/337 |
| 4,119,335 | 10/1978 | Rieffle et al. | 285/337 |
| 4,538,841 | 9/1985 | Royston | 285/337 |
| 4,569,542 | 2/1986 | Anderson et al. | 285/337 |
| 4,579,353 | 4/1986 | Bower | 285/379 X |
| 4,867,488 | 9/1989 | Jones | 285/328 |
| 5,069,490 | 12/1991 | Halen, Jr. | 285/337 |
| 5,100,183 | 3/1992 | Montesi et al. | 285/337 |

FOREIGN PATENT DOCUMENTS

| | | |
|---|---|---|
| 53-134225 | 5/1973 | Japan . |
| 53-134226 | 11/1978 | Japan . |
| 54-108922 | 8/1979 | Japan . |
| 2 272 248 | 8/1993 | United Kingdom . |

OTHER PUBLICATIONS

*The Basic Principle of Dresser® Couplings*, Technical publication, pp. 1, 4, and 5.

Primary Examiner—Anthony Knight
Assistant Examiner—Gary Grafel
Attorney, Agent, or Firm—Jones & Askew, LLP

[57] ABSTRACT

A pipe coupling for sealing a leak location in a pipe or pipeline by compressing annular gasket members against the pipe or pipeline around the leak location comprises a tubular middle ring, a pair of annular followers, and a pair of annular elastomeric gasket positioners bonded to and protruding from respective followers and positioned so that when the coupling is placed in sealing position, the gasket positioners engage the annular gasket members and force the gasket members into sealing position between the tubular middle ring and the pipe or pipeline. Suitable annular gasket members include rubber O-rings. The gasket positioners may include a retaining ring to prevent outward extrusion of the gasket positioner from between the coupling and the pipe or pipeline.

22 Claims, 4 Drawing Sheets

Fig_3

PIPE COUPLING WITH GASKET POSITIONER

TECHNICAL FIELD

This invention relates to couplings for sealing leak locations in pipes and pipelines and for adjoining adjacent pipe ends. More particularly, this invention relates to couplings of the type comprising a tubular middle ring and a pair of followers which can be bolted together to force the middle ring against annular gaskets and form a seal about a leak location in a pipe or pipeline.

BACKGROUND OF THE INVENTION

The sealing of pipe joints and other leak locations in pipes and pipelines is an important concern, and has become more important as efforts have increased to protect the environment. Liquid chemicals, sewage, toxic gases, and other fluid-like materials such as fine dust are conducted through pipelines. It is important that these materials be transported without leakage of the material from the pipeline and without contamination from outside the pipeline. To seal pipe joints and other leak locations in pipelines, pipeline installers typically encircle the joint or leak location with a cylindrical coupling.

One type of coupling which has been an effective coupling for many years is a type including a middle ring and a pair of followers which are forced against ends of the middle ring to compress the middle ring against annular rubber O-rings fitted about the pipeline around the leak location. The compressed annular gaskets form a fluid-tight seal between the coupling and the pipeline. Examples of this type of coupling are illustrated in U.S. Pat. Nos. 5,100,183; 4,569,542; 5,069,490; and 3,288,495. The foregoing patents describe the use of annular rubber gaskets which are generally wedge-shaped and custom manufactured for the particular coupling. Some of the rubber gaskets have complicated cross-sectional shapes and must be precisely oriented when installing the coupling. This creates some difficulty in properly fitting the coupling and can lead to misplaced couplings and pipeline leakage.

Furthermore, tubular middle ring and follower-type couplings have problems when the shape of the pipes onto which they are installed changes. The significance of this increases with the diameter of the pipe. Pipes, particularly buried pipes, often deform because of settlement or careless compaction of soil around the pipe, and deflect, becoming wider from 3 o'clock to 9 o'clock than from 6 o'clock to 12 o'clock. This deflection changes the space between the coupling and the pipe and the shaped rubber gaskets of the couplings are not sized and shaped to expand and fill the expanded portions of space. As a result, the coupling leaks.

Accordingly, there is a need for a tubular middle ring and follower-type coupling which is more versatile and easily installed and maintains a fluid-tight seal even when the pipe or pipeline is deflected.

SUMMARY OF THE INVENTION

The present invention solves the above-described problems by providing a pipe coupling including a tubular middle ring, a pair of annular followers, a device for forcing the pair of annular followers against the tubular middle ring and a pair of annular elastomeric gasket positioners bonded to and protruding from respective followers and positioned so as to engage the adjacent annular gasket member and force the adjacent annular gasket member into sealing position between the tubular middle ring and the pipe or pipeline. The gasket positioners allow the coupling to be used with simpler gasket members such as rubber O-rings because the gasket positioners force the annular gasket members into proper positions between the tubular middle ring and the pipeline.

More particularly, the pipe coupling of this invention seals a leak location in a pipe or pipeline by compressing annular gasket members against the pipe or pipeline around the leak location. The tubular middle ring of the coupling extends from a first end to a second end and is adapted to receive the pipe or pipeline and fit about the leak location. The pair of annular followers each have a central annular opening to receive the pipe or pipeline and are adapted to engage respective first and second ends of the tubular middle ring. The annular followers are forced against the tubular middle ring when the pipe coupling is placed in a sealing position about the pipeline. The annular elastomeric gasket positioners are positioned so that when the coupling is placed in sealing position such that the tubular middle ring is fitted about the pipe or pipeline at the leak location, the annular gasket members are fitted about the pipe or pipeline between the middle ring and the pipe or pipeline with one of the annular gasket members proximate the first end of the middle ring and another of the annular gasket member proximate the second end of the middle ring, and the annular followers forced against the respective first and second ends of the tubular middle ring, each annular elastomeric gasket positioner extends from the respective follower, between the respective end of the tubular middle ring and the pipe or pipeline, engages the adjacent annular gasket member, and forces the adjacent annular gasket member into sealing position between the tubular middle ring and the pipe or pipeline.

As explained above, suitable annular gasket members include rubber O-rings. In addition, the first and second ends of the middle ring are desirably flared radially outwardly for receiving the annular gasket members and the gasket positioners.

The elastomeric gasket positioner is desirably made of rubber having a durometer of at least about 70 and preferably includes a rigid annular retaining ring embedded in the gasket positioner proximate to and concentric with the central opening of the respective follower.

Still more particularly, each gasket positioner extends from an axially outward-facing side bonded to the respective follower to an axially inward-facing side which engages the adjacent annular gasket. Each gasket positioner desirably is bonded to the respective follower proximate the central opening of the respective follower and has a radially inward-facing side which slopes radially inwardly toward the axially inward-facing side.

Each follower desirably includes an annular axially-extending seat which fits over the respective first and second edges of the tubular middle ring when the coupling is in sealing position about the pipe or pipeline. Preferably, each gasket positioner is spaced from the seat of the respective follower forming a space for receiving respective first and second ends of the tubular middle ring between the seats of the respective followers and the respective gasket positioners when the coupling is in sealing position about the pipe or pipeline. Each follower desirably includes an annular radially-extending portion, which extends radially outwardly from the annular central opening, and an annular axially extending portion which forms the seat.

Accordingly, an object of the present invention is to provide an improved pipe coupling.

Another object of this invention is to provide a tubular middle ring and follower-type pipe coupling which is more versatile and easier to install.

Still another object of this invention is to provide a middle ring and follower-type coupling which is useful with rubber O-ring gaskets.

Other objects, features, and advantages of the present invention will become apparent upon review of the following detailed description of embodiments of the invention, when taken in conjunction with the accompanying drawings and the appended claims.

DETAILED DESCRIPTION OF DRAWINGS

Figure 1:
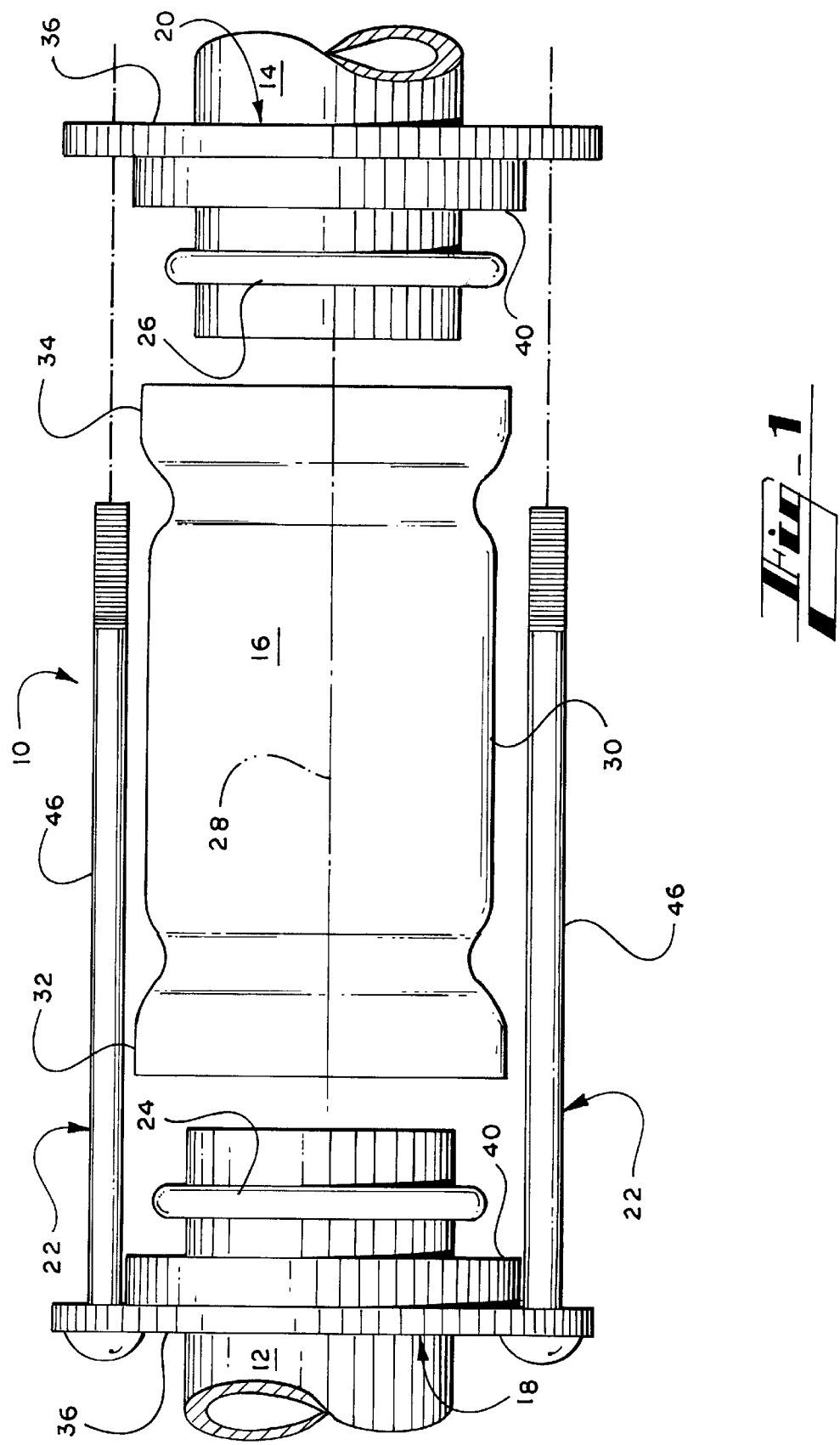
FIG. 1 is an exploded plan view of a pipe coupling made in accordance with an embodiment of the present invention and shown being fitted about adjacent pipe ends.
Figure 2:
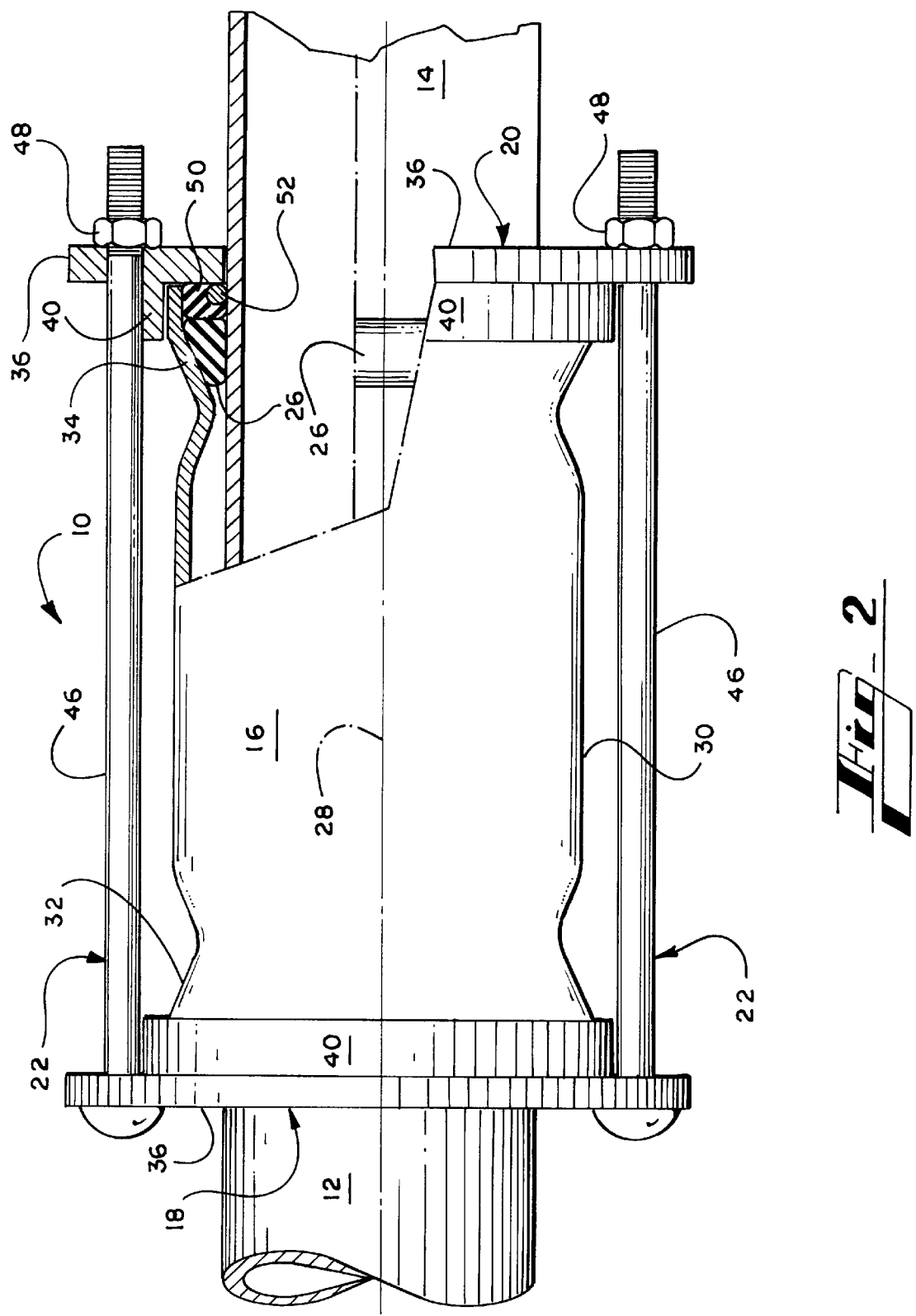
FIG. 2 is a partial plan view illustrating the coupling of FIG. 1 in sealing position about the pipe ends with a portion of the coupling cut away for illustration of the coupling interior.

Referring now in more detail to the drawings, in which like numerals refer to like parts throughout the several views, FIG. 1 shows a pipe coupling 10 made according to an embodiment of the present invention. The pipe coupling 10 is shown in an open position while being applied to a pair of adjacent pipe ends 12 and 14. FIG. 2 shows the same pipe coupling 10 in sealing position about the adjacent pipe ends 12 and 14. Generally described, the coupling 10 includes a tubular middle ring 16, a pair of opposing followers 18 and 20, and a bolt and nut assembly 22 for forcing the followers against the tubular middle ring and compressing the middle ring about a pair of spaced annular elastomeric gaskets or rubber O-rings 24 and 26 against the pipe ends 12 and 14. The O-rings 24 and 26 are fitted tightly about respective opposing pipe ends 12 and 14.

As used herein, the terms "axial" and "axially" mean a dimension generally parallel to the longitudinal axis 28 of the pipe ends 12 and 14 and the longitudinal axis 28 of the coupling 10. The longitudinal axis 28 of the pipe ends 12 and 14 and the longitudinal axis of the coupling 10 are co-axial when the pipe coupling is in sealing position about the pipe ends. The term "radial" and "radially" mean a direction substantially perpendicular to and intersecting the longitudinal axis 28 of the pipe ends 12 and 14 and the longitudinal axis of the coupling 10 when the coupling is in the sealing position.

Figure 4:
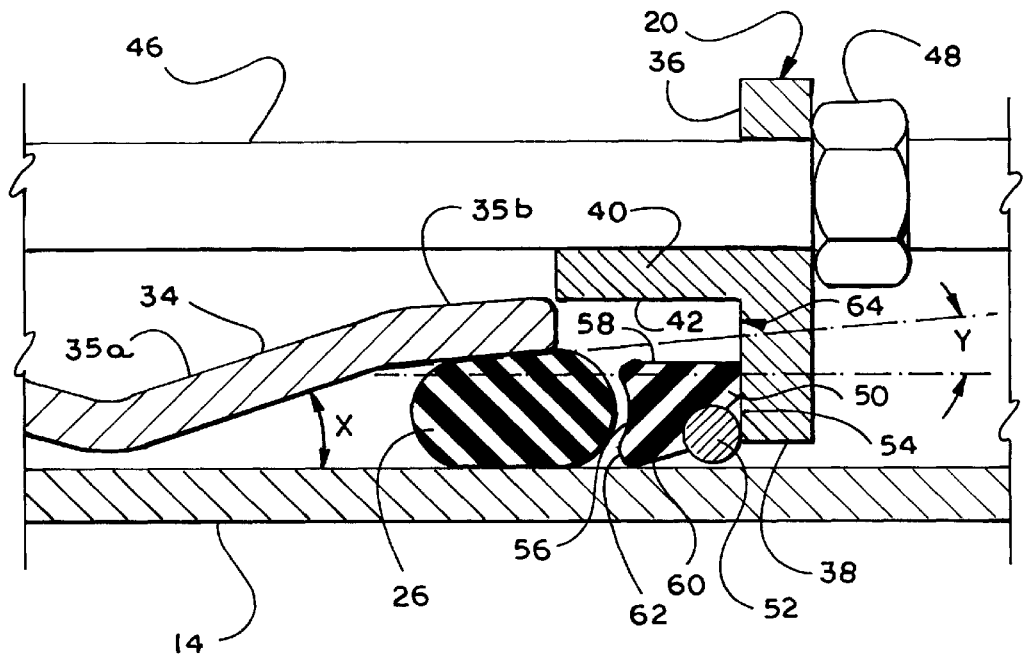
FIG. 4 is a partial sectional view of a portion of the pipe coupling shown in FIG. 1 illustrating the gasket positioner of the coupling prior to engaging the adjacent annular gasket.
Figure 5:
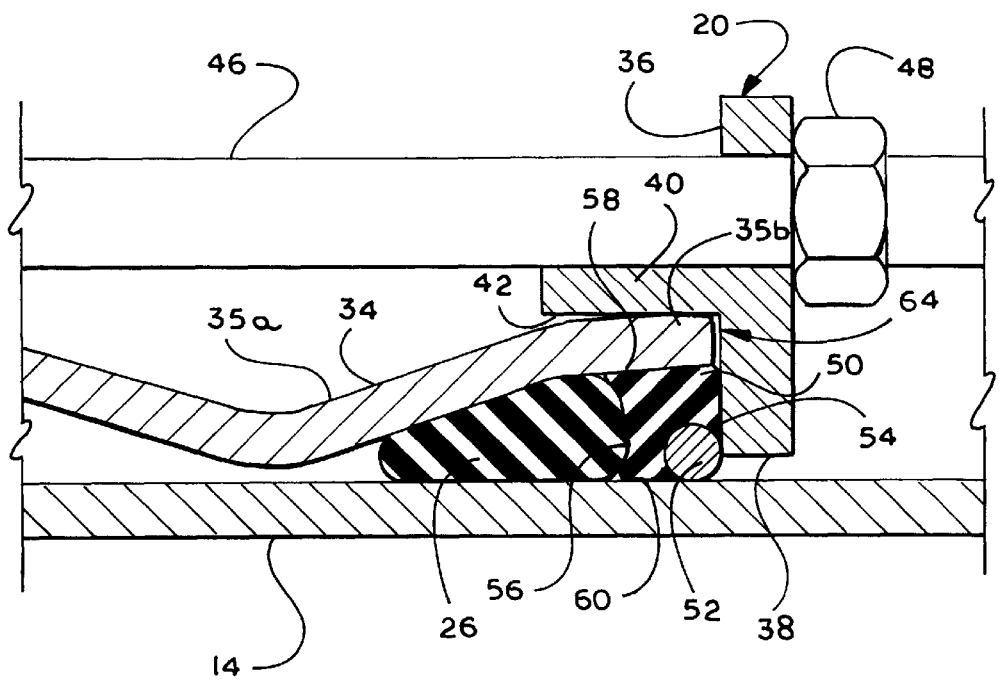
FIG. 5 is a partial sectional view of the coupling shown in FIG. 1 illustrating the gasket positioner fully engaged with the adjacent annular gasket member in sealing position.

The tubular middle ring 16 of the coupling 10 has a cylindrical mid-section 30 extending between first and second flared ends 32 and 34 which flare radially outwardly from the cylindrical mid-section. As best illustrated in FIGS. 2, 4 and 5, the rubber O-rings 24 and 26 fit between the respective flared ends 32 and 34 of the tubular middle ring 16 when the pipe coupling 10 is in the sealed position about the pipe ends 12 and 14. The tubular middle ring 16 fits closely about the pipe ends 12 and 14.

As shown in FIG. 4, the flared ends 32 and 34 of the tubular middle ring 16 both include a first angled portion 35a and a second angled portion 35b. The first angled portion 35a of each of the flared ends 32 and 34 extends radially outwardly from respective ends of the cylindrical mid-section 30 to the respective second angled portion 35b at a first angle x with respect to the longitudinal axis of the coupling 10. The second angled portion 35b of each of the flared ends 32 and 34 then extends radially outwardly from respective first angled portions 35a at a second angle y with respect to the longitudinal axis of the coupling 10 less than the first angle x. Desirably, the first angle x is about 20° and the second angle y is about 4.5°.

Each of the followers 18 and 20 includes an annular radially-extending ring portion 36, defining an annular central opening 38, and an annular axially-extending ring portion 40 extending integrally from the radially-extending ring about the annular central opening. The annular axially-extending ring 40 is concentric with the annular radially-extending ring 36. When the pipe coupling 10 is in the sealed position as illustrated in FIGS. 2 and 5, the followers 18 and 20 oppose one another and fit over and against respective ones of the first and second flared ends 32 and 34 of the tubular middle ring 16. More particularly, the annular axially-extending ring 40 of each of the followers 18 and 20 forms an axially extending seat 42 which fits over respective ones of the first and second flared ends 32 and 34 of the tubular middle ring 16.

Figure 3:
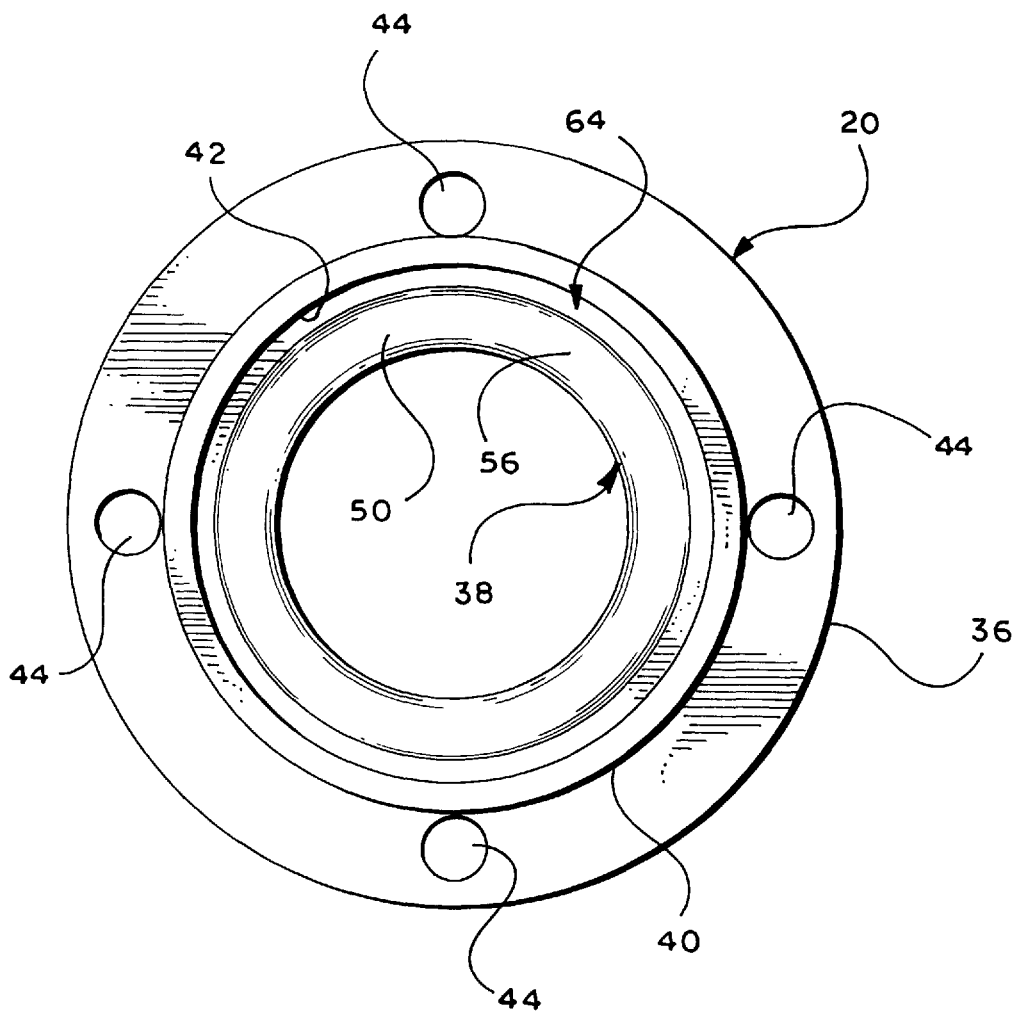
FIG. 3 is an end view of a follower which forms part of the coupling illustrated in FIG. 1.

As illustrated in FIG. 3, the radially extending rings 36 of the followers 18 and 20 have a plurality of bolt openings 44 spaced about the periphery of the followers for receiving the bolt-nut assembly 22. The bolt-nut assembly 22 includes a plurality of bolts 46, which fit through respective bolt openings 44 and the followers 18 and 20, and companion nuts 48 which fasten the bolts to the followers and when tightened, draw the followers together against the flared ends 32 and 34 of the tubular middle ring 16.

The annular elastomeric gaskets 24 and 26 are desirably rubber O-rings having a circular cross-section. Rubber O-rings are inexpensive and readily available. A particular advantage of the coupling 10 is that it is suitable for use with rubber O-rings and does not require specially shaped rubber gaskets.

To properly position the annular elastomeric gaskets 24 and 26 or O-rings into sealing position between the flared ends 32 and 34 of the tubular middle ring 16 and respective pipe ends 12 and 14, an elastomeric annular gasket positioner 50 is bonded to each of the followers 18 and 20 so that when the coupling 10 is placed in sealing position, as illustrated in FIGS. 2 and 5, each gasket positioner extends from the respective follower, between the respective ends 32 and 34 of the tubular middle ring and the respective pipe ends 12 and 14, and engages the adjacent one of the annular gasket members 24 and 26, and forces the adjacent one of the annular gasket members into sealing position between the tubular middle ring and the pipe ends. Without the gasket positioners 50, the annular gasket members 24 and 26 do not seat far enough inward with respect to the tubular middle ring 16. The gasket positioners 50 force the annular gasket members 24 and 26 between the first angled portion 35a of the flared ends 32 and 34 and the pipe ends 12 and 14, while the gasket positioners fit between the second angles portions 35b and the pipe ends. This creates a large amount of force on the annular gasket members 24 and 26, forcing the gasket members to distort from their original configuration and conform to the space between the first angled portions 35a of the flared ends 32 and 34 and the pipe ends 12 and 14. The rubber annular gasket members 24 and 26, however, are resilient and, if the pipe ends 12 and 14 deform and the gap between the tubular middle ring 16 and the pipe ends expands, the annular gasket members rebound toward their original O-ring shape and fill the expanded gap.

Each gasket positioner 50 is desirably made of a relatively hard rubber having a durometer of at least about 70, and preferably at least about 80. Suitable rubber includes nitrile rubber and others. The gasket positioners 50 are bonded to the followers 18 and 20 with rubber cement such as SC 2000 rubber cement available from Rema Tip Top, Stahlgruber, Munich, Germany. In addition, each gasket positioner 50 desirably includes a metal retaining ring 52 embedded in the gasket positioner proximate the annular central opening 38 of the respective one of the followers 18 and 20 to prevent the gasket positioner from being extruded between the respective follower and the adjacent one of the pipe ends 12 and 14 when the followers are drawn into sealing position.

Each gasket positioner 50 has a substantially polyhedral shape and includes an axially-outward facing side 54 bonded to an inward-facing side of the respective one of the followers 18 and 20 proximate the annular central opening 38. In addition, each gasket positioner 50 includes an axially inward-facing side 56, which is desirably concave, and engages the adjacent one of the annular gaskets 24 and 26 when the coupling 10 is in the sealing position. Each gasket positioner 50 also has a radially outward-facing side 58 and a radially inward-facing side 60 extending between the axially outward-facing side 54 and the axially inward-facing side 56. The radially inward-facing side 60 of each gasket positioner 50 slopes radially inwardly toward the axially inward-facing side 56 from the retaining ring 52 to a lip 62 which engages the adjacent one of the annular gaskets 24 and 26 proximate the adjacent one of the pipe ends 12 and 14. Each gasket positioner 50 is spaced from the axially extending seat 42 of the respective one of the followers 18 and 20 to receive the respective one of the flared ends 32 and 34 of the tubular middle ring 16 when the followers are drawn into the sealing position.

The construction of the components of the pipe coupling 10 can vary as is understood by those skilled in the art. The materials for such components must not be subject to the significant corrosion by the substance within the pipeline, and some pipelines must be resistant to deterioration caused by the external environment, such as water, a corrosive atmosphere, the weather, or other particular environment. The tubular middle ring 16, followers 18 and 20, and bolt-nut assembly 22 are desirably made of a metal such as carbon or stainless steel. The annular gaskets 24 and 26 and the gasket positioners 50 are made of elastomeric material such as rubber.

Installation of the pipe coupling 10 will be apparent from the foregoing description. First, the followers 18 and 20 are fitted about their respective pipe ends 12 and 14 so that the pipe ends extend through the annular central openings 38 of the followers. The followers 18 and 20 are positioned so that the annular axially extending ring 40 of each follower faces the other. Next, the annular elastomeric gaskets or O-rings 24 and 26 are placed about respective pipe ends 12 and 14. The tubular middle ring 16 is fitted between the adjacent pipe ends 12 and 14 and the pipe ends are brought together so that both pipe ends extend through the flared ends 32 and 34 of the middle ring into the cylindrical mid-section 30 of the middle ring. The bolts 46 are then fed through the bolt openings 44 in the followers 18 and 20 and the companion nuts 48 are threaded onto the ends of the bolts to tighten the bolt-nut assembly 22 and draw the followers 18 and 20 together. The bolt-nut assembly 22 is tightened until the coupling 10 reaches the sealed position illustrated in FIGS. 2 and 5. In the sealed position, the flared ends 32 and 34 of the middle ring 16 fit in the spaces 64 between the axial extending seats 42 of the followers 18 and 20 and the gasket positioners 50 until the flared ends abut the radially extending rings 36 of the respective followers 18 and 20. As the followers 18 and 20 are drawn into the sealing position, the gasket positioners 50 engage the elastomeric gaskets 24 and 26 and force the elastomeric gaskets between the pipe ends 12 and 14 and the flared ends 32 and 34 of the tubular middle ring 16. The concave, axially inward-facing sides 56 of the gasket positioners 50 initially engage the annular elastomeric gaskets 24 and 26 and, in the sealing position, the annular elastomeric gaskets 24 and 26 and the elastomeric gasket positioners 50 deform and conform to the space between the flared ends 32 and 34 of the tubular middle ring 16 and the pipe ends 12 and 14 to form a fluid tight seal between the coupling 10 and the pipe ends. The retaining rings 52 of the gasket positioners 50 prevent the elastomeric gasket positioners from being extruded out of the coupling 10 between the pipe ends 12 and 14 and the respective followers 18 and 20 when the coupling is placed in the sealing position.

The foregoing description only relates to embodiments of the present invention, and numerous changes and modifications may be made therein without departing from the scope of the invention as defined in the following claims.

I claim:

1. A pipe coupling for sealing a leak location in a pipe or pipeline by compressing annular gasket members against the pipe or pipeline around the leak location, the pipe coupling comprising:

a tubular middle ring adapted to receive the pipe or pipeline and fit about the leak location, the tubular middle ring extending from a first end to a second end;

a pair of annular followers each having a central annular opening to receive the pipe or pipe line and being adapted to engage respective first and second ends of the tubular middle ring;

means for forcing the pair of annular followers against the tubular middle ring; and a pair of annular elastomeric gasket positioners bonded to and protruding from respective followers and positioned so that when: (a) the coupling is placed in sealing position such that the tubular middle ring is fitted about the pipe or pipeline at the leak location, (b) said annular gasket members are fitted about the pipe or pipeline between the middle ring and the pipe or pipeline with one of the annular gasket members proximate the first end of the middle ring and another of the annular gasket members proximate the second end of the middle ring, and (c) the annular followers are forced against the respective first and second ends of the tubular middle ring, each annular elastomeric gasket positioner extends to define a space having as the boundaries, the interior surface of the middle ring, the end of the middle ring, and the exterior of the pipe or pipeline and engages the adjacent annular gasket member, and forces the adjacent annular gasket member into sealing position between the tubular middle ring and the pipe or pipeline.

2. A pipe coupling as in claim 1 wherein the annular gasket members are O-rings.

3. A pipe coupling as in claim 1 wherein the first and second ends of the middle ring are flared radially outwardly.

4. A pipe coupling as in claim 1 wherein the elastomeric gasket positioner is made of rubber having a durometer of at least about 70.

5. A pipe coupling as in claim 1 wherein each gasket positioner extends from an axially outward-facing side bonded to the respective follower to an axially inward-facing side which engages the adjacent annular gasket.

6. A pipe coupling as in claim 5 wherein each gasket positioner is bonded to the respective follower proximate the central opening of the respective follower, and each gasket positioner has a radially inward-facing side which slopes radially inwardly toward the axially inward-facing side.

7. A pipe coupling as in claim 6 wherein the gasket positioner is substantially polyhedral.

8. A pipe coupling as in claim 1 wherein each follower includes an annular axially extending seat which fits over the respective first and second edges of the tubular middle ring when the coupling is in sealing position about the pipe or pipeline, and each gasket positioner is spaced from the seat of the respective follower forming a space for receiving respective first and second ends of the tubular middle ring between the seats of the respective followers and the respective gasket positioners when the coupling is in sealing position about the pipe or pipeline.

9. A pipe coupling as in claim 8 wherein each follower includes an annular radially extending portion, which extends radially outwardly from the annular central opening, and an annular axially extending portion which forms the seat.

10. A pipe coupling as in claim 9 wherein the elastomeric gasket positioner is made of rubber having a durometer of at least about 70.

11. A pipe coupling as in claim 10 wherein each gasket positioner extends from an axially outward-facing side bonded to the respective follower to an axially inward-facing side which engages the adjacent annular gasket.

12. A pipe coupling as in claim 11 wherein each gasket positioner is bonded to the respective follower proximate the central opening of the respective follower, and each gasket positioner has a radially inward-facing side which slopes radially inwardly toward the axially inward-facing side.

13. A pipe coupling as in claim 1 wherein each gasket positioner further comprises a rigid annular retaining ring embedded in the gasket positioner proximate to and concentric with the central opening of the respective follower.

14. A pipe coupling as in claim 1 wherein the forcing means comprises a nut and bolt assembly extending between the pair of followers for drawing the followers together.

15. A pipe coupling for sealing a leak location in a pipe or pipeline by compressing annular gasket members against the pipe or pipeline around the leak location, the pipe coupling comprising:

a pair of annular gasket members;

a tubular middle ring adapted to receive the pipe or pipeline and fit about the leak location, the tubular middle ring extending from a first end to a second end;

a pair of annular followers having an annular central opening to receive the pipe or pipe line and being adapted to engage respective first and second ends of the tubular middle ring;

means for forcing the pair of annular followers against the tubular middle ring; and a pair of annular elastomeric gasket positioners bonded to and protruding from respective followers and positioned so that when: (a) the coupling is placed in sealing position such that the tubular middle ring is fitted about the pipe or pipeline at the leak location, (b) said annular gasket members are fitted about the pipe or pipeline between the middle ring and the pipe or pipeline with one of the annular gasket members proximate the first end of the middle ring and another of the annular gasket members proximate the second end of the middle ring, and (c) the annular followers are forced against the respective first and second ends of the tubular middle ring, each annular elastomeric gasket positioner extends from to define a space having as the boundaries, the interior surface of the middle ring, the end of the middle ring, and the exterior of the pipe or pipeline, and engages the adjacent annular gasket member, and forces the adjacent annular gasket member into sealing position between the tubular middle ring and the pipe or pipeline.

16. A pipe coupling as in claim 15 wherein the annular gasket members are rubber O-rings.

17. A follower for use with a pipe coupling for sealing a leak location in a pipe or pipeline by compressing annular gasket members between a tubular middle ring and the pipe or pipeline around the leak location when the follower is engaged with an annular end of the tubular middle ring, the follower comprising:

an annular radially-extending portion having an annular central opening for receiving the pipe or pipe line;

an annular axially extending seat which extends from the radially extending portion and fits over the edge of the tubular middle ring when the follower is engaged with the tubular middle ring; and an annular elastomeric gasket positioner bonded to and protruding from the radially-extending portion of the follower and positioned so that the annular elastomeric gasket positioner extends to define a space having as the boundaries, the interior surface of the middle ring, the end of the middle ring, and the exterior of the pipe or pipeline, and engages an adjacent one of the annular gasket members when the follower is engaged with the tubular middle ring about the pipe or pipeline.

18. A follower as in claim 17 wherein the gasket positioner is spaced from the seat of the follower forming a space for receiving the end of the tubular middle ring.

19. A follower as in claim 17 wherein the elastomeric gasket positioner is made of rubber having a durometer of at least about 70.

20. A follower as in claim 17 wherein the gasket positioner extends from an axially outward-facing side bonded to the radially extending portion to an axially inward-facing side which engages the adjacent annular gasket when the follower is engaged with the tubular middle ring.

21. A follower as in claim 20 wherein the gasket positioner is bonded to the radially extending portion proximate the central opening of the follower and each gasket positioner has a radially inward-facing side which slopes radially inwardly toward the axially inward-facing side.

22. A follower as in claim 17 wherein the gasket positioner further comprises a rigid annular retaining ring embedded in the gasket positioner proximate to and concentric with the central opening of the follower.

* * * * *